United States Patent Office.

JESSE WINWARD, OF EAST CAMBRIDGE, MASSACHUSETTS.

Letters Patent No. 92,683, dated July 13, 1869.

---

IMPROVEMENT IN THE MANUFACTURE OF GLUE FROM THE PITH OF HORNS.

---

The Schedule referred to in these Letters Patent and making part of the same.

---

*To all whom it may concern:*

Be it known that I, JESSE WINWARD, of East Cambridge, in the county of Middlesex, and State of Massachusetts, have invented an Improved Glue, and process for manufacturing the same; and I hereby declare that the following is a full, clear, and exact description thereof.

Glue has heretofore been manufactured chiefly from the hoofs and skins or hides of cattle, but the pith contained within the horns has never been utilized, and has always been regarded as of no value.

To utilize this waste stock is the object of my invention, which consists in the employment and treatment of the pith in such manner as to enable me to produce therefrom a fine quality of inodorous glue.

To enable others skilled in the art to understand and use my invention, I will proceed to describe the manner in which I have carried it out.

Soon after the horned creature is killed, the pith within the horns decomposes so as to render its removal therefrom an easy matter.

These piths are collected and steeped about four (4) hours in a solution of oxalic acid, of about the strength of one (1) degree, after which they are removed, and washed in cold water, and then steeped about four (4) hours in lime-water of a strength of about three (3) degrees.

After being removed from the lime-water, they are placed in a solution of muriatic acid, of a strength of about (5) degrees, and allowed to remain about thirty (30) hours, or until they become soft, when they are removed, and washed in cold water.

The steeping of the piths in lime-water, as above described, may be dispensed with if desired, and a good result still be obtained.

The above-described process serves to remove the chief portion of the bony substance of the pith, and retain its glutinous properties, while at the same time it renders it inodorous.

The pith thus prepared is in a condition to convert into glue, and may be sold in this state, and may be at any time dissolved by boiling in water about one half of an hour, in a suitable vessel, from which it is drawn off and formed into sheets in a well-known manner.

The above-described glue being inodorous, is particularly adapted for use in preparing the warp-threads of carpets, and various other woollen and cotton fabrics, in lieu of the ordinary glue, which is objectionable on account of its disagreeable odor, in consequence of which manufacturers have, in many cases, been obliged to discard glue, and employ some inferior substitute therefor, such as paste made from damaged flour, starch, &c.

Glue, however, is best adapted for the purpose, and my improved glue can be freely used without imparting any disagreeable odor to the carpet or fabric to which it is applied.

By treating the pith as I have above described, a valuable merchantable article is made from what has heretofore been regarded as utterly worthless, thus effecting a great saving, and producing an inodorous glue of superior quality, which, besides being used for the purposes above described, may also be employed wherever the ordinary glue is found applicable.

Claims.

What I claim as my invention, and desire to secure by Letters Patent, is—

The within-described process of preparing the piths of horns, substantially as and for the purpose described.

Also, as a new article of manufacture, glue prepared from the piths of horns, substantially as set forth.

JESSE WINWARD.

Witnesses:
P. E. TESCHEMACHER,
N. W. STEARNS.